United States Patent [19]

Honda et al.

[11] Patent Number: 5,650,853
[45] Date of Patent: Jul. 22, 1997

[54] VIBRATION-RESISTANT INTERFEROMETER

[75] Inventors: Toshio Honda, Yotsukaido; Katsuyuki Okada, Chiba, both of Japan

[73] Assignees: Fuji Photo Optical Co., Ltd., Saitama; Honda, Toshio, Yotsukaido; Osaka, Katsuyuki, Chiba, all of Japan

[21] Appl. No.: 542,030

[22] Filed: Oct. 12, 1995

[30] Foreign Application Priority Data

Oct. 12, 1994 [JP] Japan .................................. 6-246308

[51] Int. Cl.⁶ ............................................. G01B 9/02
[52] U.S. Cl. ............................................ 356/359; 356/363
[58] Field of Search ........................... 356/359, 360, 356/363

[56] References Cited

U.S. PATENT DOCUMENTS

5,432,606  7/1995  Noguchi et al. ................. 356/359
5,589,938  12/1996  Deck ................................ 356/359

Primary Examiner—Frank G. Font
Assistant Examiner—Amanda Merlino
Attorney, Agent, or Firm—Ronald R. Snider

[57] ABSTRACT

In a vibration-resistant interferometer, an interference fringe image obtained by an image capturing means is analyzed and an optical path difference between a reference light component and an object light component is maintained at a predetermined value with reference to the result of this analysis, thereby making its optical system simple in structure, easy to adjust, and inexpensive to manufacture and maintain. A Fizeau-type interferometer, a CCD camera for viewing an interference fringe, a computer for analyzing the interference fringe image information obtained by the CCD camera to calculate the shape of the sample surface or the amount of vibration or inclination of the sample surface, and a PZT driving circuit for transmitting predetermined driving signals to PZTs are provided.

4 Claims, 6 Drawing Sheets

FIG. 4
INCLINATION CORRECTION SUBROUTINE

FIG.6

VIBRATION-RESISTANT INTERFEROMETER

BACKGROUND OF THE INVENTION

1. Field of the Invention

The present invention relates to a vibration-resistant interferometer which is hard to be influenced by external vibrations as well as turbulence in the air near the sample to be measured. In particular, the present invention relates to a vibration-resistant interferometer which is suitable for measuring the surface shape of optical members and the like, in which the results of measurement should be highly accurate, at their manufacturing sites.

2. Description of the Prior Art

Interferometers have conventionally been known as a means for detecting minute irregularities on the surface of optical members and the like in view of fringes formed by optical interferences.

As high-precision processing technologies have recently been developed, there is a demand for an interferometer which can be mounted on a processing machine or the like so as to measure processing surfaces of products with a high accuracy at their processing sites.

The interferometer mounted on the processing machines or the like at the processing site is easily influenced by vibrations which its optical system receives externally as well as turbulence in the air near the surface to be processed. It is actually difficult for such an interferometer to attain a highly accurate result of measurement unless it can exclude influences of the above-mentioned vibrations and air turbulence to minimize the disorder in interference fringes, even when the interferometer is theoretically supposed to perform measurements with a high accuracy.

As an interferometer which can exclude the above-mentioned influences of vibrations and air turbulence, attention has been paid to a so-called common-path interferometer in which a reference luminous flux and an object luminous flux can travel through nearly the same path so that they are similarly subjected to such influences, thereby substantially canceling their relative phase changes.

Figure 6:
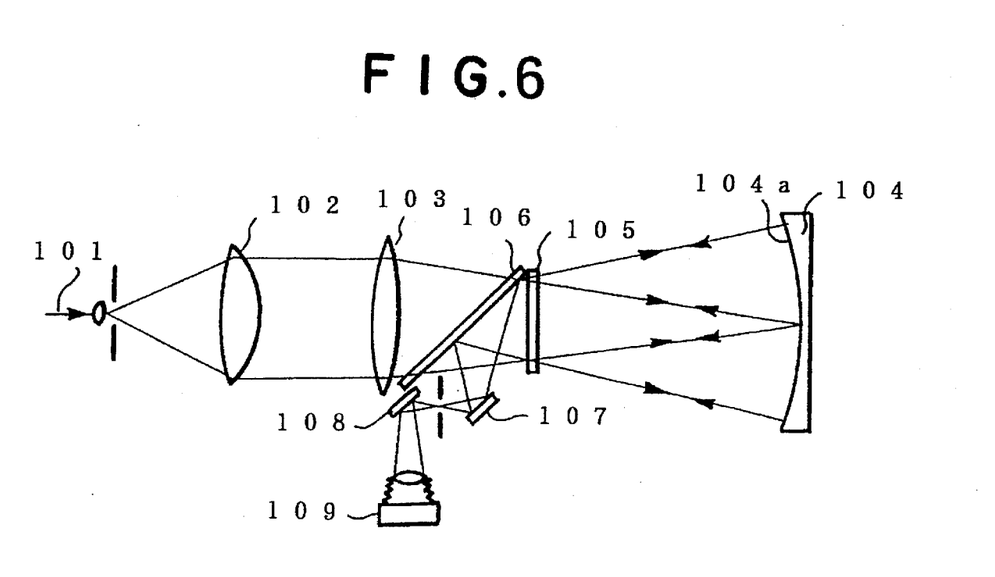
FIG. 6 is a schematic view showing a conventional vibration-resistant interferometer.

FIG. 6 shows a zone-plate interferometer which is a typical example of the common-path interferometer. In this interferometer, in order for a laser light beam 101 to be focused by lenses 102, 103 onto a concave surface, i.e. sample surface 104a, of a sample 104, a zone plate 105 is disposed in the optical path of thus focused luminous flux. As the laser light beam 101 is introduced into the zone plate 105, it is divided into a first luminous flux diverging from the center of curvature of the sample surface 104a and a second luminous flux directed to the center of the surface of the sample 104. Thereafter, these luminous fluxes are reflected by the sample surface 104a and then reenter the zone plate 105. The first luminous flux passes through the zone plate 105 to directly advance, while the second luminous flux is diffracted by the zone plate 105. Accordingly, they overlap with each other and then, by way of mirrors 107, 108, reach the film surface of a camera 109 to form interference fringes thereon which correspond to the irregularities of the sample surface 104a.

The light components of the first and second luminous fluxes reflected on the sample surface 104a respectively function as object light and reference light. Since these two luminous fluxes are reflected on the same sample surface 104a and pass through substantially the same positions, changes in their phase differences will be canceled by each other even if there are external vibrations, air turbulence, and the like. Accordingly, an image of interference fringes obtained by the interference of the two luminous fluxes can yield highly accurate results of measurement.

However, in the common-path interferometer such as the above-mentioned zone-plate (Fresnel zone-plate) interferometer, it is difficult to adjust the positions of the zone plate and other optical systems. Accordingly, its optical systems are complicated in structure and costs for their manufacture and maintenance become higher.

SUMMARY OF THE INVENTION

In view of the foregoing, the object of the present invention is to provide a vibration-resistant interferometer whose optical systems are simple in structure, easy to adjust, and inexpensive to manufacture and maintain.

The first vibration-resistant interferometer in accordance with the present invention comprises:

an interference fringe forming means for illuminating a reference surface on a reference plate and a ample surface on a sample with coherent light such that an interference fringe is formed by a reference light component from the reference surface and an object light component from the sample surface;

an image capturing means for capturing the interference fringe formed by the interference fringe forming means;

a vibration amount calculating means for calculating an amount of vibration of the sample surface with reference to interference fringe image information output from the image capturing means;

a vibration providing means for providing a predetermined vibration to a member in an optical path of the interference fringe forming means; and a driving means for driving the vibration providing means, with reference to the amount of vibration calculated by the vibration amount calculating means, to negate this amount of vibration such that an optical path difference between the reference light component and the object light component is set to a predetermined value.

The second vibration-resistant interferometer in accordance with the present invention comprises:

an interference fringe forming means for illuminating a reference surface on a reference plate and a ample surface on a sample with coherent light such that an interference fringe is formed by a reference light component from the reference surface and an object light component from the sample surface;

an image capturing means for capturing the interference fringe formed by the interference fringe forming means;

an inclination amount calculating means for calculating, with reference to interference fringe image information output from the image capturing means, an amount of inclination of the sample surface with respect to the reference surface resulting from vibration of the sample surface;

a inclination correcting means for correcting a relative inclination of the reference surface and the sample surface with respect to each other; and a driving means for driving the inclination correcting means, with reference to the amount of inclination calculated by the inclination amount calculating means, to correct this amount of inclination such that the reference surface and the ample surface maintain their predetermined inclinations which are substantially parallel to each other.

The interferometers in accordance with the present invention may be constructed such that the shape of the ample surface is calculated by the vibration amount calculating means or inclination amount calculating means with reference to the image information on the interference fringe output from the image capturing means, while the amount of information used for calculation of the shape of the sample surface is kept smaller than that used for calculation of the amount of vibration or inclination of the sample surface.

In the first vibration-resistant interferometer in accordance with the present invention, with reference to the interference fringe image information representing the shape of the ample surface obtained by the image capturing means, the vibration amount calculating means calculates the amount of vibration of the sample surface and, with reference to the result of this calculation, a predetermined vibration is applied to a member in an optical path such that the optical path difference between the reference light component from the reference surface and the object light component from the object surface is set to a predetermined value to negate the vibration of the sample surface. As the distance between the reference surface and the sample surface, i.e. the optical path difference between the reference light component and the object light component, is adjusted to the predetermined value, the influence of vibration on the interference fringe to be viewed can be minimized.

While the first vibration-resistant interferometer is concerned with the amount of vibration of the sample surface itself, the second vibration-resistant interferometer pays attention to the inclination of the sample surface resulting from the vibration of the sample surface. Namely, in the second interferometer, with reference to the interference fringe image information representing the shape of the sample surface obtained by the image capturing means, the inclination amount calculating means calculates the inclination of the sample surface effected by the vibration of the sample surface and, with reference to the result of this calculation, the inclination of the reference surface or sample surface is corrected such that the reference surface and sample surface have their predetermined inclinations which are substantially parallel to each other. As the inclinations of the reference surface and sample surface are adjusted so as to be parallel to each other such that the optical path difference between the reference light component and the object light component is maintained at a predetermined value, the influence of vibration on the interference fringe to be viewed can be minimized.

In the apparatuses in accordance with the present invention as constructed above, their optical systems are not so complicated as in the case with the aforesaid common-path interferometer. Accordingly, the position of the optical systems can easily be adjusted, while costs for their manufacture and maintenance are kept inexpensive.

The vibration amount calculating means or inclination amount calculating means may be constructed mechanically as well as by means of software with a computer. When it is constructed by software with a computer, in particular, conditions for calculating the amount of vibration or inclination can easily be changed. Accordingly, the conditions can appropriately be set according to any circumstances in view of the frequency, amplitude and response of vibration, and so on.

The vibration amount calculating means or inclination amount calculating means analyzes the interference fringe image information obtained by the image capturing means. In this respect, this process is in common with the processing for aimed measurement in which the shape of the sample surface is measured with reference to the interference fringe image information.

Accordingly, as mentioned above, the vibration amount calculating means or inclination amount calculating means may also be used for conducting the processing for aimed measurement of the shape of the ample surface, thereby improving the efficiency in the structure of the interferometer.

As the calculated amount of vibration or inclination is used as control information for stabilizing the interference fringe, its required accuracy is not so severe as that in the aimed measurement of the shape of the sample surface. Accordingly, the amount of information on the interference fringe used for calculating the amount of vibration or inclination may be set smaller than that used for the aimed calculation of the shape of the ample surface, thereby increasing the ratio of the period for calculating the sample surface or the like. Thus, the sample surface can be measured with a high accuracy, while efficiently stabilizing the interference fringe.

DESCRIPTION OF THE PREFERRED EMBODIMENTS

In the following, the embodiments of the present invention will be explained with reference to the attached drawings.

Figure 1:
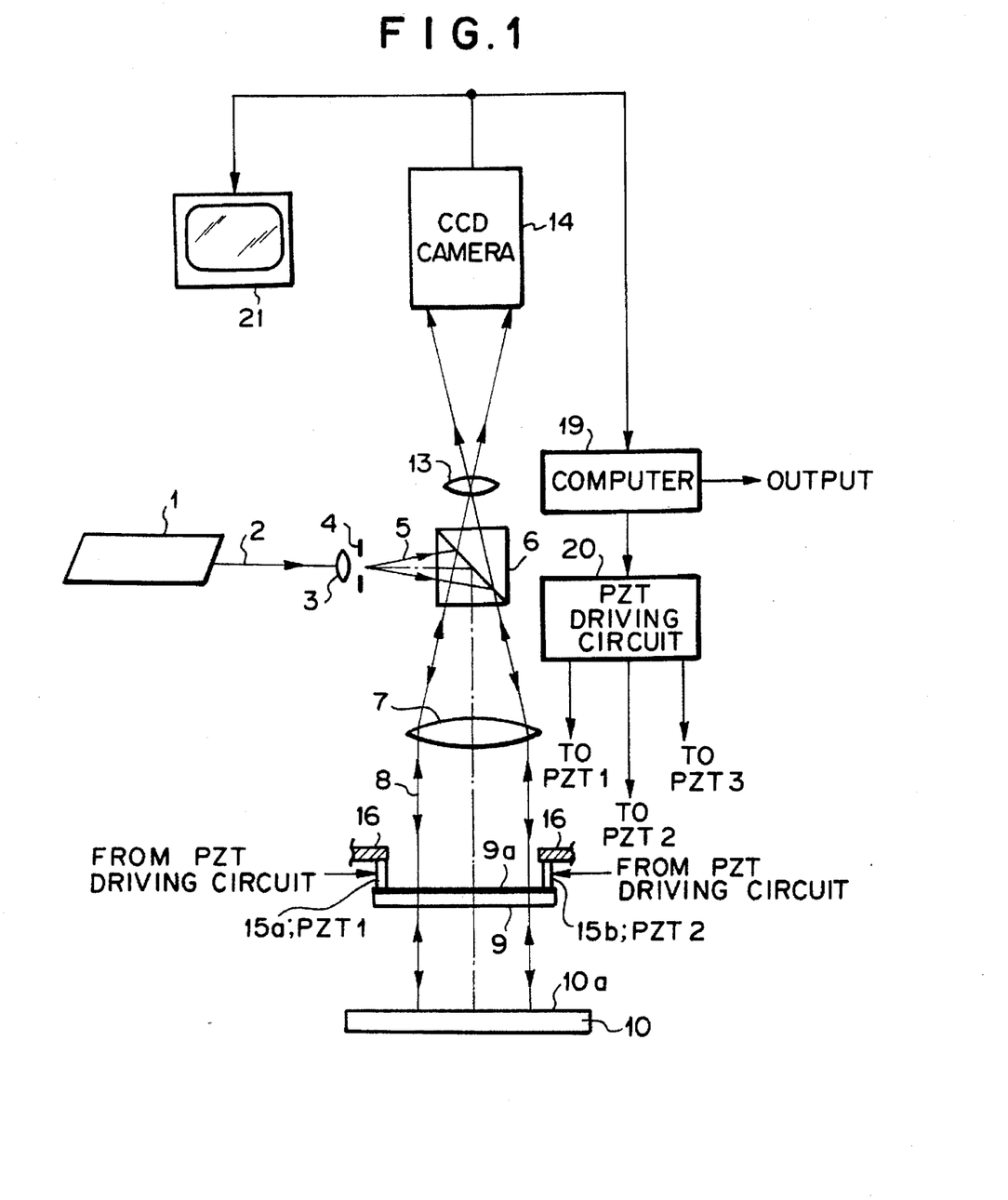
FIG. 1 is a schematic view showing an optical system in the vibration-resistant interferometer in accordance with an embodiment of the present invention.

FIG. 1 is a schematic view for explaining a vibration-resistant interferometer in accordance with an embodiment of the present invention. This vibration-resistant interferometer comprises a laser light source 1; a divergent lens 3 for converting a laser beam 2 into a divergent light component 5; an aperture 4; a beam splitter 6; a collimator lens 7 for generating an enlarged collimated light component 8; a reference plate 9 having a half-mirror reference surface 9a disposed in perpendicular to the collimated light component 8 so as to partially reflect the collimated light component 8, while allowing the rest of the collimated light component 8 to pass therethrough so as to illuminate a sample surface 10a of a sample 10; piezoelectric elements (referred to as "PZT", i.e. PZT1, PZT2, and PZT3, in the following) 15a, 15b for vertically moving or tilting the reference plate 9; and a lens 13 and a CCD camera 14 for viewing the interference fringe formed by interference of a reference light component reflected from the reference surface 9a and an object light component reflected from the sample surface 10a with each other.

This interferometer further comprises a computer 19 for analyzing the image information on the interference fringe obtained by the CCD camera 14 to calculate the shape of the sample surface or the amount of vibration or inclination thereof and a PZT driving circuit 20 for transmitting predetermined driving signals to the PZT 15a, 15b with reference to the result of calculation.

As noted above, the reference plate 9 has another PZT, which is not depicted, in addition to the depicted two PZTs 15a, 15b. These three PZTs 15a, 15b (including the non-depicted PZT in the following even when simply referred to as "PZTs 15a, 15b") are disposed in the periphery of the reference plate 9 with substantially the same distance therebetween. The reference plate 9 is held by a fixing frame 16 by way of the three PZTs 15a, 15b.

The image information on the interference fringe obtained by the CCD camera 14 is transmitted to and displayed on a monitor 21 so as to be judged by an operator with his/her eyes.

In the following, the function of the interferometer in accordance with this embodiment will be explained.

The laser beam 2 from the laser light source 1 is reflected on the reflective surface of the beam splitter 6 toward the reference plate 9 and converted through the collimator lens 7 into the collimated light component 8, which is then reflected by the reference surface 9a and the sample surface 10a to respectively form the reference light component and the object light component.

Thereafter, the reference light component and the object light component overlap with each other and pass through the reflective surface of the beam splitter 6 to form an interference fringe image on the CCD image-receiving surface of the CCD camera 14.

The interference fringe image on the CCD image-receiving surface is then opto-electrically converted into an image signal and transmitted to the monitor 21 and the computer 19.

The computer 19 analyzes the image information on the interference fringe carried by the image signal to calculate the shape of the ample surface 10a and outputs the result of this calculation.

The interferometer in accordance with this embodiment uses a so-called fringe scanning method, in which the relative distance between the reference surface 9a and the sample surface 10a is changed and the interference fringe is analyzed with reference to the resulting change in density at a predetermined position, thereby enabling fine judgement of irregularities in the shape of the ample surface 10a.

In order to exclude the influence of the vibration applied thereto, this interferometer calculates the inclination of the ample surface 10a and tilts the reference surface 9a in response to this inclination. Namely, the amounts of driving force for the three PZTs 15a, 15b are mutually changed such that the reference surface 9a is positioned in parallel to the sample surface 10a.

The amount of driving force for each of the three PZTs 15a, 15b is calculated with reference to the image information on the interference fringe input into the computer 19. The computer 19 transmits the result of calculation into the PZT driving circuit 20. Based on this result, the PZT driving circuit 20 transmits predetermined driving voltages to the PZTs (PZT1, PZT2, and PZT3) 15a, 15b.

In the following, an example of the calculation program in the computer 19 will be explained with reference to the flow charts shown as FIGS. 2–5.

Figure 2:
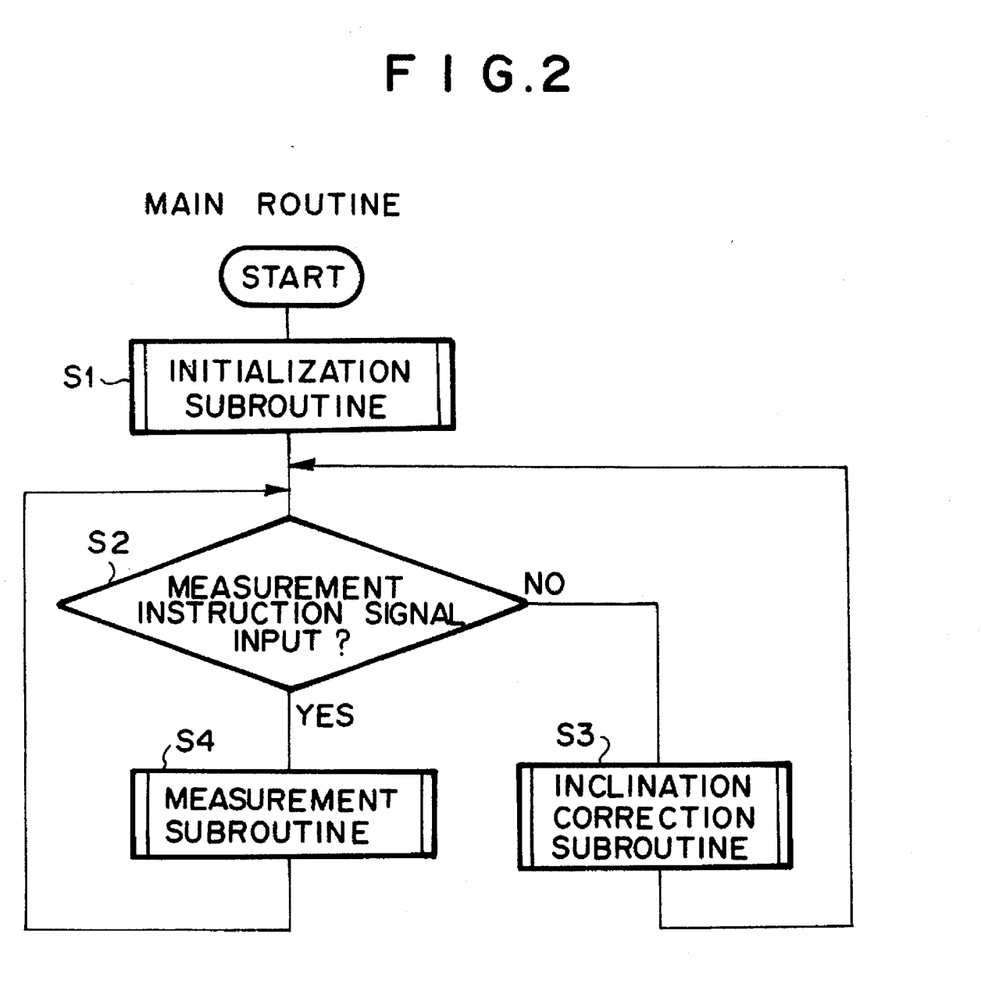
FIG. 2 is a flow chart showing a processing procedure of a calculation program run by the computer represented in FIG. 1.

First, the main routine of this calculation program is explained with reference to FIG. 2.

When this main routine starts, an initialization subroutine is run at first (S1). This initialization subroutine is a routine for calculating a reference data used for the subsequent comparison in order to correct an inclination.

When the running of the initialization subroutine (S1) ends, it is judged whether an instruction signal for measuring the ample surface 10a has been input or not (S2). If not, an inclination correction subroutine is run (S3) to calculate the amount of driving force for the PZT 15a, 15b which is to be driven to correct the inclination of the sample surface 10a. If the instruction signal has been input, on the other hand, a measurement subroutine is run (S4) to measure the shape of the sample surface 10a.

When the running of the inclination correction subroutine and measurement subroutine (S3, S4) ends, step 2 (S2) is run again to judge whether an instruction signal for measurement has been input or not. In other words, the inclination correction subroutine is repeatedly run (S3) unless the instruction signal for measurement is input, whereas the measurement subroutine is run only when the instruction signal for measurement is input (S4).

The instruction signal for measurement is input in response to an operator's external key operation.

Figure 3:
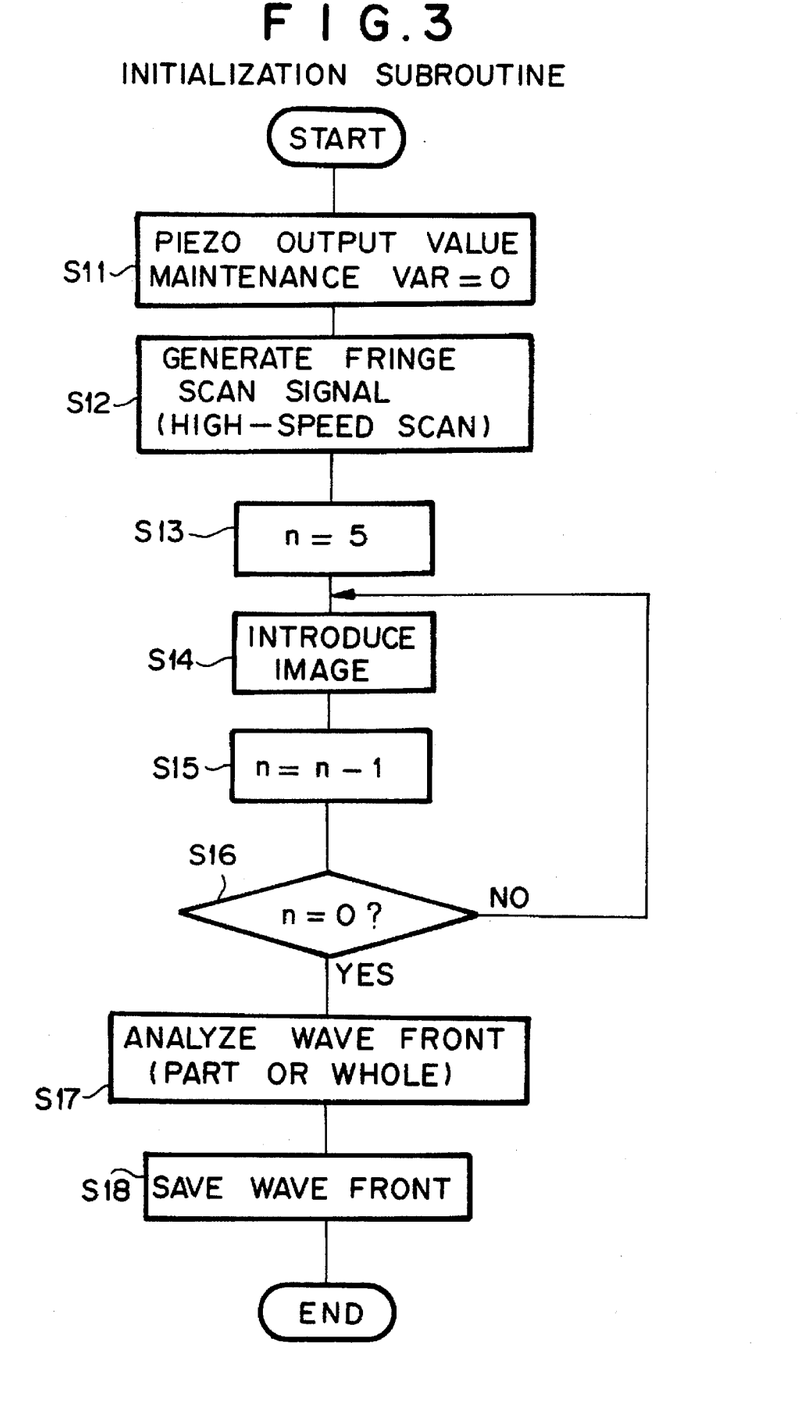
FIG. 3 is a flow chart showing a processing procedure in the initialization subroutine represented in FIG. 2.

In the following, the initialization subroutine will be explained with reference to FIG. 3.

As mentioned above, the initialization subroutine is a routine for introducing the condition of the interference fringe at the time immediately after the start of the main routine into the computer 19 as the initial value for correcting the inclination. This routine is run only once on the condition where the interference fringe is observed.

Specifically, at first, the variable for maintaining the piezoelectric output value is reset to 0 so as to initialize the amount of piezoelectric driving force (S11). Then, a fringe scan signal is generated so as to drive the PZTs 15a, 15b with amounts equal to each other. Namely, the same voltage is applied to the three PZTs 15a, 15b such that the relative distance between the reference surface 9a and the sample surface 10a changes so as to move the interference fringes by one fringe or so.

As the fringe scan at this time is used for correcting the inclination, its accuracy may not be so high as that used for calculating the shape of the sample surface 10a. Accordingly, in order to shorten the processing time, a high-speed scan (e.g. five-phase method) is used.

Then, the number of images to be introduced, n, is set to 5 in step 13 (S13). Thereafter, 5 sheets of images are introduced (S14, S15, S16). The images are introduced with a phase interval therebetween substantially the same as the period within which 5 sheets of the interference fringe images move by one fringe.

Then, the wave front of the introduced interference fringe image is analyzed (S17). The analyzed initial condition of the wave front is stored in a memory of the computer 19 (S18). In the subsequent inclination correction subroutine, correction is made such that a wave front condition actually obtained coincides with the stored initial condition of the wave front.

When analyzing the wave front (S17), the whole image data may not always be analyzed. Only the data necessary for correcting the inclination of the sample surface 10a may be analyzed.

Figure 4:
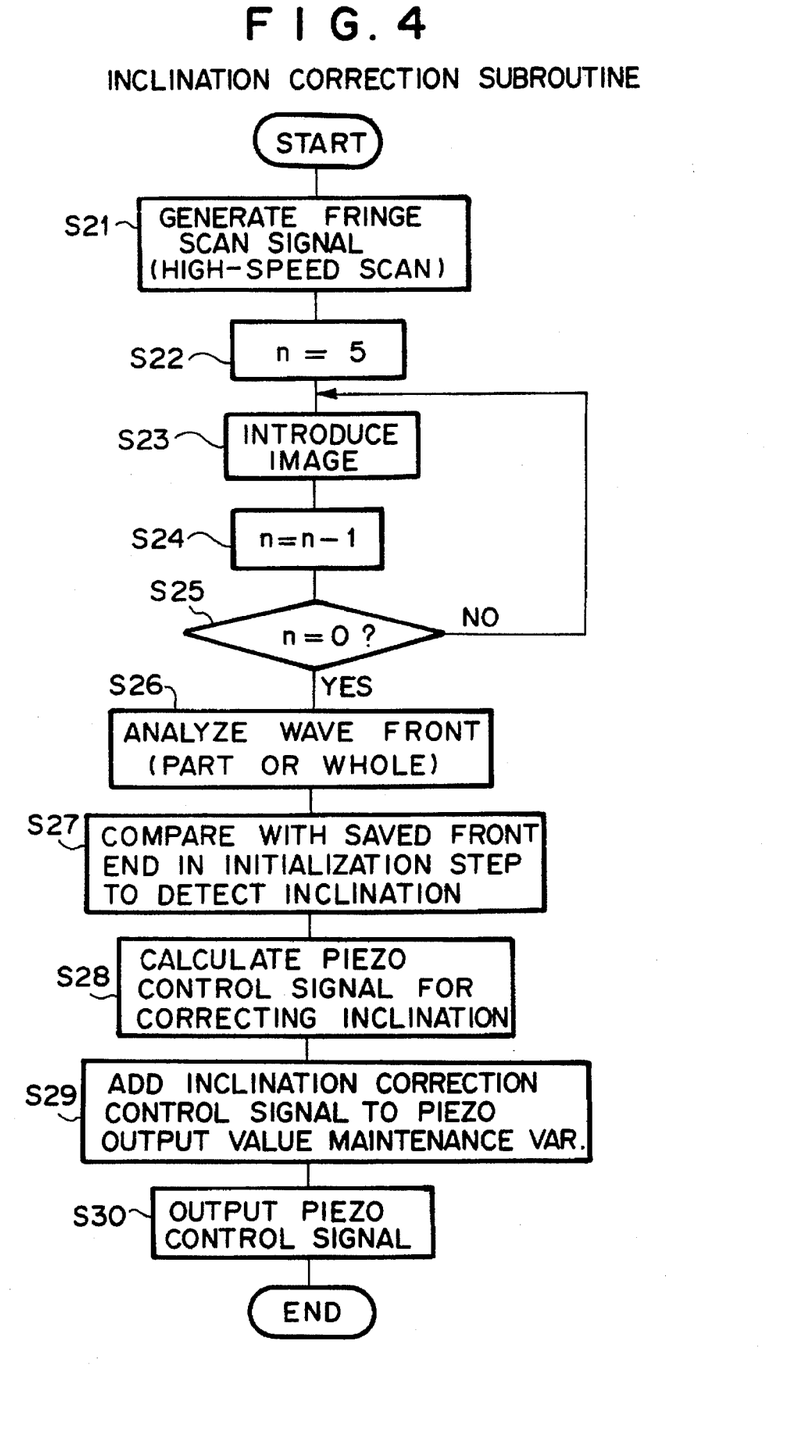
FIG. 4 is a flow chart showing a processing procedure in the inclination correction subroutine represented in FIG. 2.

In the following, the inclination correction subroutine will be explained with reference to FIG. 4.

The processing of step 21 (S21) to step 26 (S26) in this inclination correction subroutine is not explained here since it is the same as that of step 12 (S12) to step 17 (S17) in the initialization subroutine.

In step 27 (S27), the wave front actually obtained is compared with the wave front stored in the initialization subroutine to detect an inclination.

The piezoelectric control signal (driving signal for the PZTs 15a, 15b) for correcting this inclination is calculated (S28) and thus calculated control signal is added to the variable for maintaining the piezoelectric output value (S29).

Then, based on the variable for maintaining the piezoelectric output value set at step 29, piezoelectric signals are output to the PZTs 15a, 15b (S30).

Figure 5:
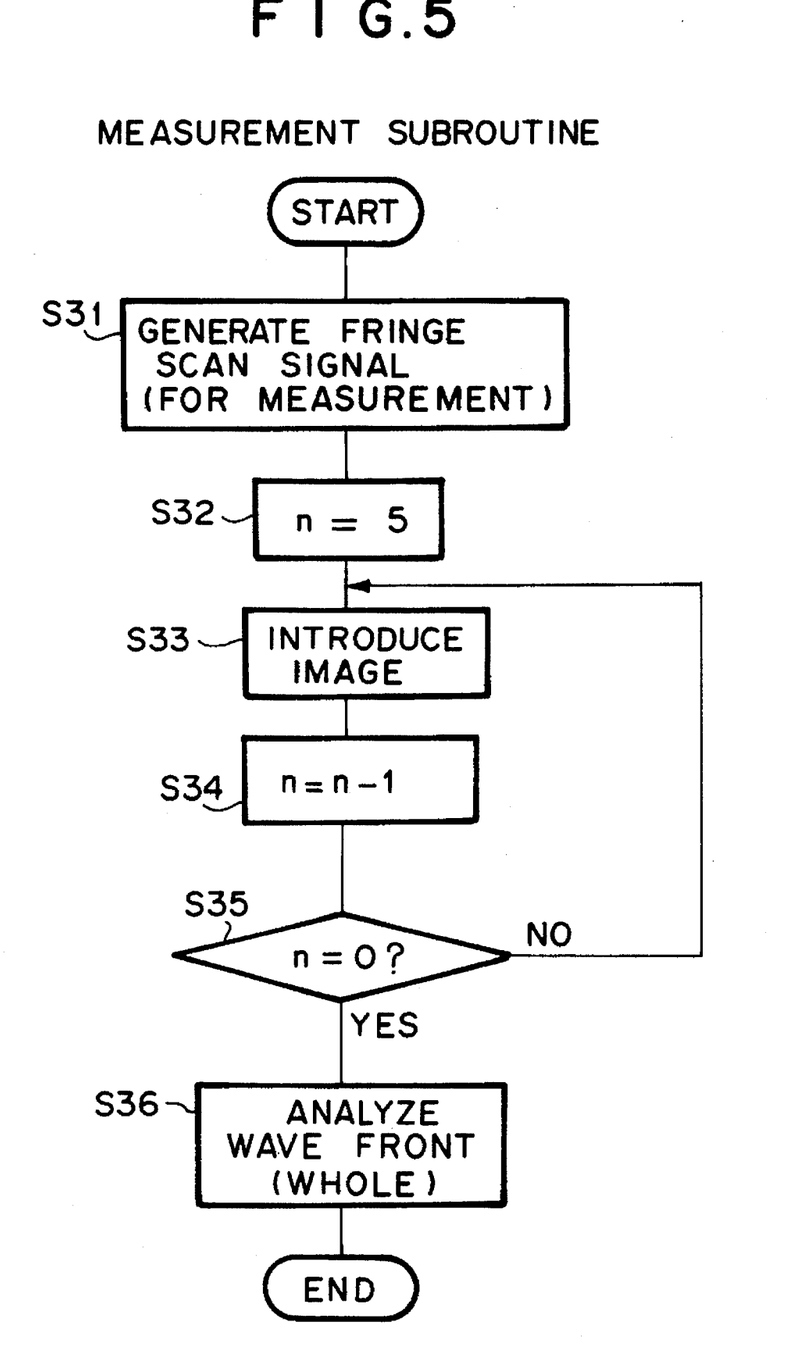
FIG. 5 is a flow chart showing a processing procedure in the measurement subroutine represented in FIG. 2.

In the following, the measurement subroutine will be explained with reference to FIG. 5.

The processing of step 31 (S31) to step 36 (S36) in this measurement subroutine is substantially the same as that of step 12 (S12) to step 17 (S17) in the initialization subroutine or that of step 21 (S21) to step 26 (S26) in the inclination correction subroutine.

However, differently from the fringe scan signal generated in step 12 (S12) or step 21 (S21), the fringe scan signal generated in step 31(S31) has a low speed, by which image information for measurement can be obtained with a high accuracy. Also, while only a part of the data may be analyzed in step 17 (S17) or step 26 (S26) to obtain information for correcting the inclination, the whole interference fringe image information has to be processed in the analysis processing of the wave front in step 36 (S36) in order to detect the shape of the whole sample surface 10a.

Without being restricted by the above embodiment, the vibration-resistant interferometer in accordance with the present invention can be modified in various ways.

For example, in order to correct the inclination of the sample surface resulting from the vibration during the time when the shape of the sample surface is being detected, the inclination correction subroutine may be run every time one interference fringe image is obtained by the measurement subroutine.

Also, the number of interference fringe images introduced for every analysis processing of the wave front may not only be set to 5 but any plural number.

Further, only one interference fringe image may be used in the analysis processing of the wave front for correcting the inclination. Namely, for example, it is possible to use:

(1) a technique utilizing a so-called spatial carrier method in which an appropriate tilt is applied to the interference fringe such that a wave front phase can be detected from one interference fringe image with a high speed; or (2) a technique in which a fringe pattern of one interference fringe image is recognized and a piezoelectric driving signal which can fix this pattern is generated and output.

While the above embodiment corrects the inclination of the sample surface resulting from external vibrations, the amount of vibration of the sample surface may be corrected in lieu of or together with this technique in a similar way. For example, when "inclination" in step 27 (S27), step 28 (S28), and step 29 (S29) in the inclination correction subroutine is changed to "amount of vibration", an example of a program (flow chart) for correcting the amount of vibration of the sample surface can be represented.

Whereas the apparatus in accordance with the above embodiment in accordance with the present invention is a Fizeau-type interferometer, other interferometers such as those of Michelson type and Mach-Zehnder type may be used as well.

While the above embodiment tilts the reference surface in order to correct the inclination of the sample surface, the sample surface for measurement itself may be tilted or the interferometer as a whole may be moved instead of the reference surface. Also, depending on the type of the interferometer, optical members in the optical paths of the reference light component and object light component may be moved.

The sample surface may not only be a plane but a convex sphere or an aspheric surface, for example.

What is claimed is:

1. A vibration-resistant interferometer comprising:

an interference fringe forming means for illuminating a reference surface on a reference plate and a sample surface on a sample with coherent light such that an interference fringe is formed by a reference light component from said reference surface and an object light component from said sample surface;

an image capturing means for capturing the interference fringe formed by said interference fringe forming means;

a vibration amount calculating means for calculating an amount of vibration of said sample surface with reference to interference fringe image information output from said image capturing means;

a vibration providing means for providing a predetermined vibration to a member in an optical path of said interference fringe forming means; and a driving means for driving said vibration providing means, with reference to the amount of vibration calculated by said vibration amount calculating means, to negate said amount of vibration such that an optical path difference between said reference light component and said object light component is set to a predetermined value.

2. A vibration-resistant interferometer comprising:

an interference fringe forming means for illuminating a reference surface on a reference plate and a sample surface on a sample with coherent light such that an interference fringe is formed by a reference light component from said reference surface and an object light component from said sample surface;

an image capturing means for capturing the interference fringe formed by said interference fringe forming means;

an inclination amount calculating means for calculating, with reference to interference fringe image information output from said image capturing means, an amount of inclination of said simple surface with respect to said reference surface resulting from vibration of said sample surface;

a inclination correcting means for correcting a relative inclination of said reference surface and said sample surface with respect to each other; and a driving means for driving said inclination correcting means, with reference to the amount of inclination calculated by said inclination amount calculating means, to correct said amount of inclination such that said reference surface and said sample surface maintain their predetermined inclinations which are substantially parallel to each other.

3. A vibration-resistant interferometer according to claim 1 in which a shape of said sample surface is calculated by said vibration amount calculating means with reference to the interference fringe image information output from said image capturing means, while the amount of information used for calculation of the shape of said sample surface is kept smaller than that used for calculation of the amount of vibration of said sample surface.

4. A vibration-resistant interferometer according to claim 2 in which a shape of said sample surface is calculated by said inclination amount calculating means with reference to the interference fringe image formation output from said image capturing means, while the amount of information used for calculation of the shape of said sample surface is kept smaller than that used for calculation of the amount of inclination of said sample surface.

* * * * *